(12) United States Patent
O'Dwyer

(10) Patent No.: US 7,207,256 B2
(45) Date of Patent: Apr. 24, 2007

(54) WEAPONS PLATFORM CONSTRUCTION

(75) Inventor: James Michael O'Dwyer, Brisbane (AU)

(73) Assignee: Metal Storm Limited, Brisbane, Queensland (AU)

( * ) Notice: Subject to any disclaimer, the term of this patent is extended or adjusted under 35 U.S.C. 154(b) by 0 days.

(21) Appl. No.: 10/495,131

(22) PCT Filed: Oct. 24, 2002

(86) PCT No.: PCT/AU02/01441

§ 371 (c)(1),
(2), (4) Date: Nov. 12, 2004

(87) PCT Pub. No.: WO03/042620

PCT Pub. Date: May 22, 2003

(65) Prior Publication Data

US 2005/0081708 A1 Apr. 21, 2005

(30) Foreign Application Priority Data

Nov. 12, 2001 (AU) .................................... PR8801

(51) Int. Cl.
*F41A 23/02* (2006.01)

(52) U.S. Cl. .................... 89/37.22; 89/37.19; 89/1.41

(58) Field of Classification Search ............... 89/1.41, 89/126, 127, 37.16, 37.19, 37.22
See application file for complete search history.

(56) References Cited

U.S. PATENT DOCUMENTS

| | | |
|---|---|---|
| 2,979,991 A | 4/1961 | Buschers |
| 3,429,220 A | 2/1969 | Goode et al. |
| 4,036,611 A | 7/1977 | Bennett et al. |
| 4,040,334 A | 8/1977 | Smethers, Jr. |
| 4,452,123 A | 6/1984 | Holtrop et al. |
| 4,489,638 A * | 12/1984 | Bastian et al. ............. 89/1.815 |
| 4,938,115 A * | 7/1990 | von Maydell ................ 89/1.51 |
| 5,191,165 A * | 3/1993 | Oskarsson et al. ............. 89/15 |

(Continued)

FOREIGN PATENT DOCUMENTS

AU 62790/94 9/1994

(Continued)

OTHER PUBLICATIONS

International Search Report, PCT/AU02/01441, Oct. 24, 2002, 3 pages.

(Continued)

*Primary Examiner*—Stephen M. Johnson
(74) *Attorney, Agent, or Firm*—Blakeley, Sokoloff, Taylor & Zafman, LLP

(57) ABSTRACT

A vehicular weapons platform (30) including a plurality of barrel assemblies (10), wherein each barrel assembly includes a barrel (11), a plurality of projectiles (14) axially disposed within the barrel for operative sealing engagement with the bore of the barrel (11) and discrete propellant charges (15) for propelling respective projectiles sequentially through the muzzle of the barrel; and at least one of said plurality of barrel assemblies (10) includes a barrel which also forms a structural member of the weapons platform. In one preferred form, the weapons platform takes the form of a small combat aerial vehicle (SCAV) (30), wherein the barrel assemblies (10) form the airframe. A method of constructing a weapons platform from the barrel assemblies is also described.

4 Claims, 5 Drawing Sheets

U.S. PATENT DOCUMENTS 5,600,912 A * 2/1997 Smith .................. 42/76.01
5,883,329 A * 3/1999 O'Dwyer .................. 102/217

FOREIGN PATENT DOCUMENTS

| DE | 3932812 | 4/1991 |
| FR | 2278052 | 2/1976 |
| GB | 1563131 | 4/1976 |
| GB | 2103157 | 2/1983 |
| GB | 2120991 | 12/1983 |
| WO | WO 97/04281 | 2/1997 |
| WO | WO-0106197 | 1/2001 |
| WO | WO0153370 A1 | 7/2001 |

OTHER PUBLICATIONS

International Search Report, PCT/AU02/01504, (Nov. 11, 2002), 4 pages.

* cited by examiner

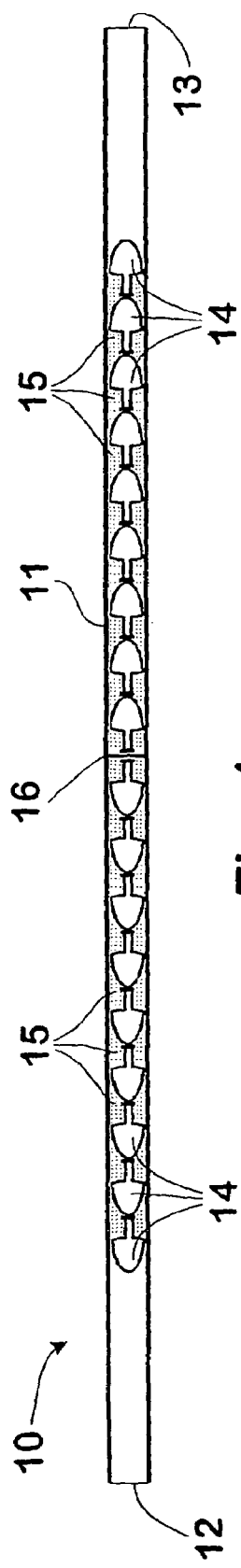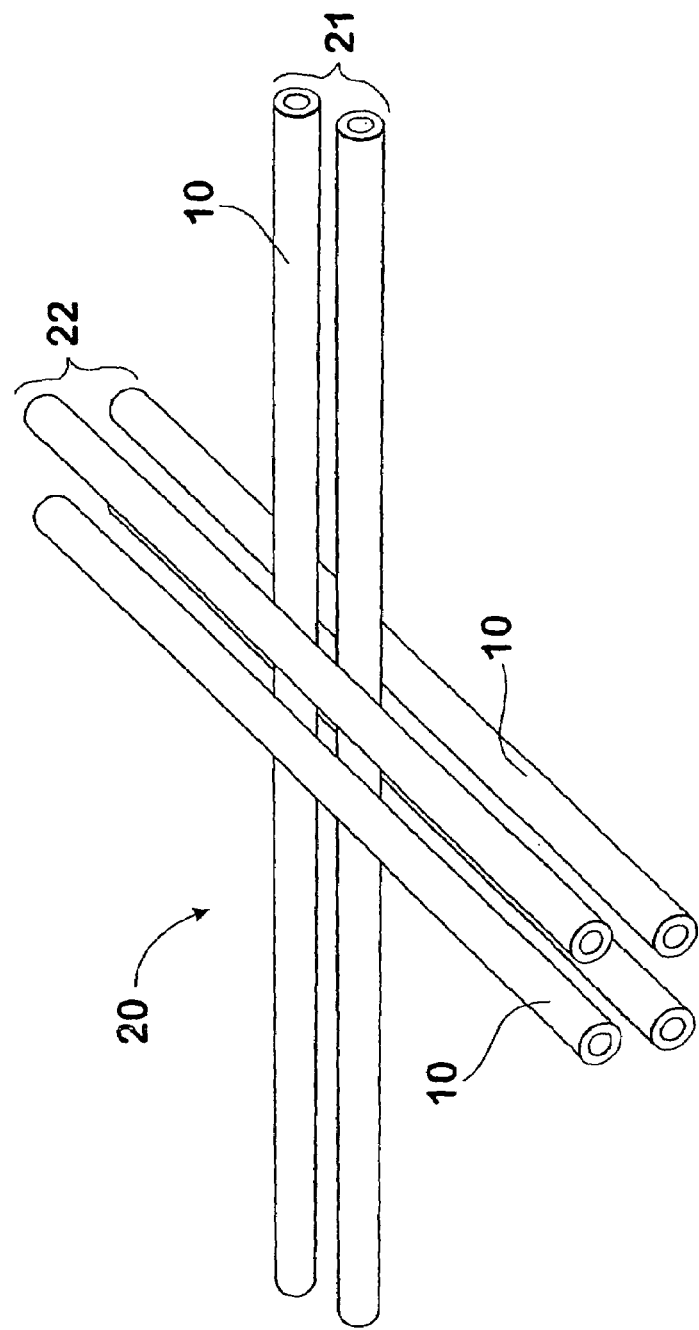
Fig. 1
Fig. 2

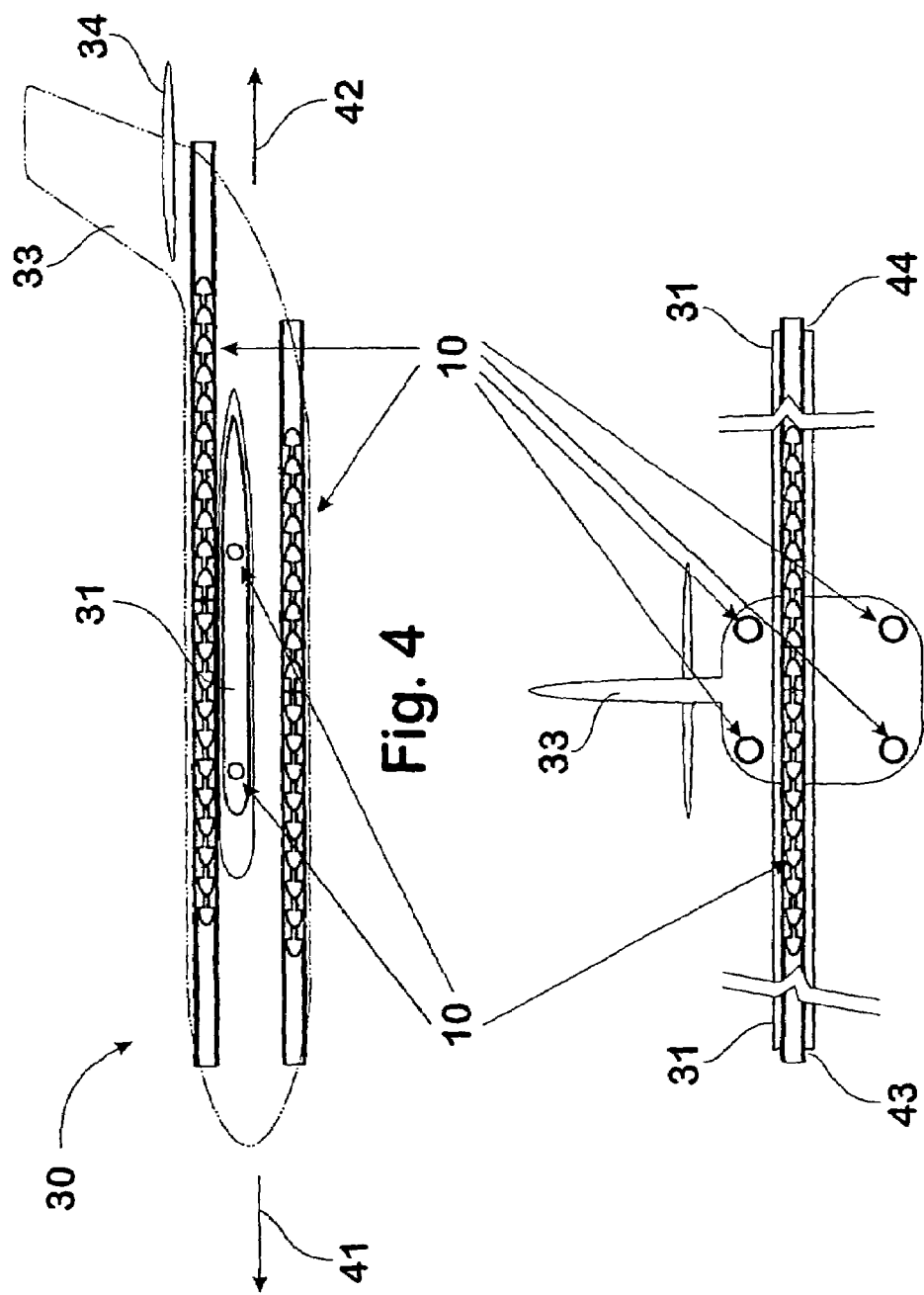

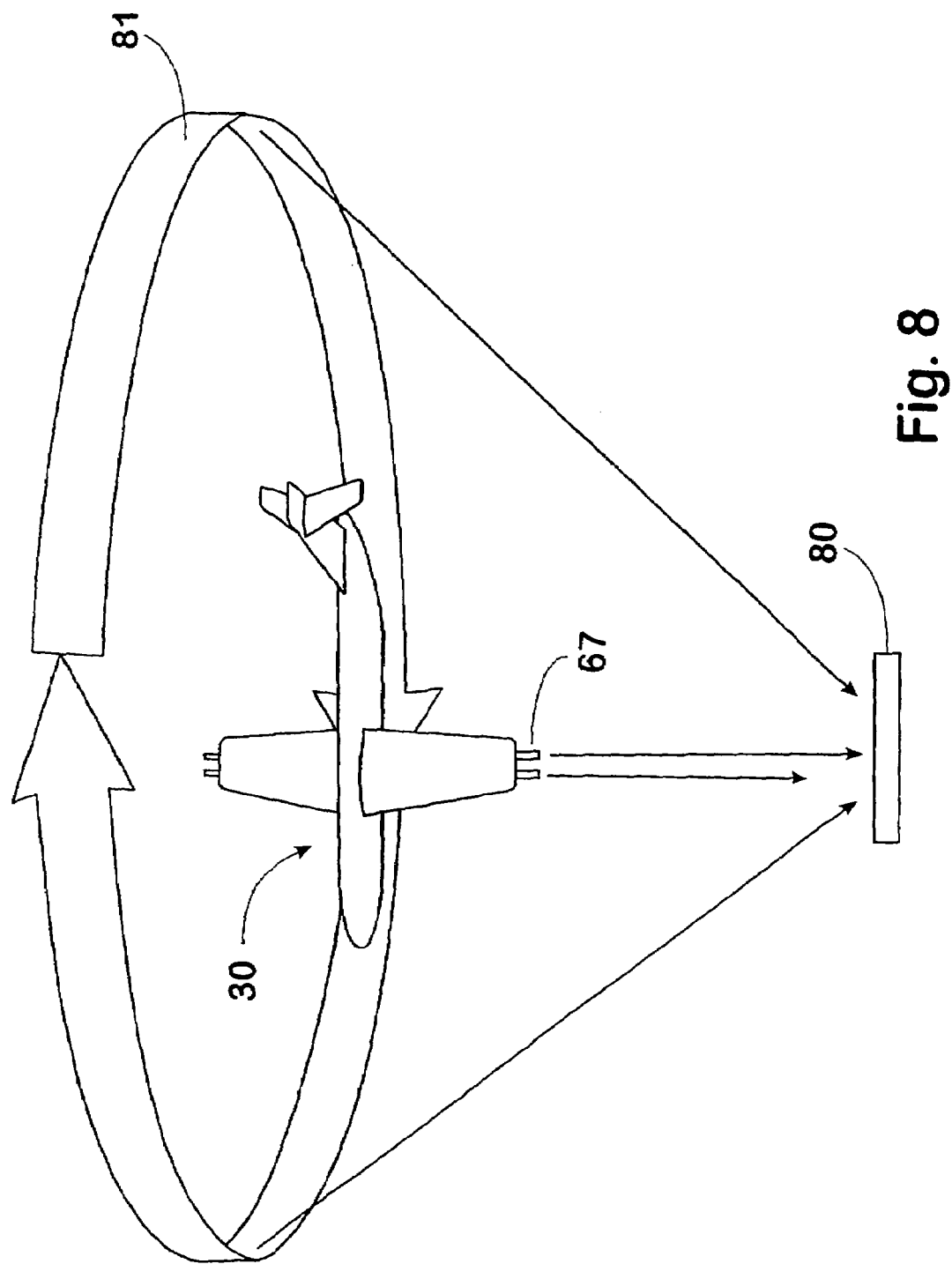

WEAPONS PLATFORM CONSTRUCTION

The present patent application is a non-provisional application of International Application No. PCT/AU02/01441, filed Oct. 24, 2002, which claims priority from Australian Application PR8801/01 filed Nov. 12, 2001, which is herein incorporated by reference.

BACKGROUND OF THE INVENTION

1. Field of the Invention

This invention relates to vehicular weapons platforms and methods of construction thereof. The invention finds particular, but not exclusive application in relation to the construction of airborne vehicles.

2. Discussion of the Background Art

Weapons systems are typically fitted to existing vehicular platforms as separate and discrete components, albeit in many cases functionally integrated with other mechanical and electronic systems of the vehicle. The mass of weapons systems is often a key consideration in the design of mobile platforms together with allowance for dynamic effects of firing, such as recoil and changes to mass distribution as ammunition is consumed. Weapon mass, its distribution and dynamic firing effects impinge directly on vehicle performance characteristics.

In the case of small compact vehicles, the choice of weapons systems available may be practically limited or even obviated. However, in many cases it would be advantageous to effectively arm a vehicle without significantly compromising its performance. Many existing vehicles, particularly those in the nature of compact surveillance aircraft or investigatory robots, are typically relatively slow moving, operate at low altitude and are often unarmed, and consequentially susceptible to small arms fire.

In a few isolated examples, it has been proposed that missile tubes might be integrated into the structure of large aircraft, such as a wide bodied heavy jet in U.S. Pat. No. 4,040,334 (Smethers, Jr.) and in a ground effects or amphibious craft in United Kingdom Patent No. 2,120,991 (Kjolseth & Mowill). However, it is clearly not viable to provide a missile launch capability as proposed for small compact vehicles of the kind particularly suited to the present invention.

SUMMARY OF THE INVENTION

Object of the Invention

Accordingly, it is desirable to provide a vehicular weapons platform and a method of construction of a weapons platform that addresses the drawbacks of designing new vehicles and/or the drawbacks of equipping existing vehicles with conventional weapons systems, particularly compact remotely controlled vehicles for use in hostile environments.

Disclosure of the Invention

In one broad form, the present invention resides in a compact weapons platform including a plurality of barrel assemblies wherein the barrel assemblies form both weapons and structural members of the weapons platform. Suitably, barrels of said barrel assemblies are each formed from a relatively lightweight tube, preferably composed of composite materials such as engineered plastics or carbon fibre composites. If required, the tubes may be combined in a common walled cellular construction. Preferably, the barrel assemblies are arranged for firing projectiles simultaneously from opposed ends of the barrel in order to minimise undesirable recoil effect.

In one preferred application, the weapons platform comprises a vehicle wherein the barrel assemblies form a structural frame of the vehicle, or at least a part of the structural frame. In the case of an airborne vehicle, such as a fixed or rotary wing aircraft, the barrel assemblies may form the airframe and/or wing spars of the fuselage and/or wings of the aircraft.

In another form the invention resides in a method of construction of a weapons platform, said method including the step of forming one or more structural members of the weapons platform from a plurality of barrel assemblies of a weapon. Suitably, the barrel assemblies are arranged with barrels directed in opposite directions in order to minimise undesirable recoil effect upon firing.

The present invention has particular application to barrel assemblies of the type described by the present inventor in International Patent Application Nos. PCT/AU94/00124 and PCT/AU96/00459. Such barrel assemblies include a barrel; a plurality of projectiles axially disposed within the barrel for operative sealing engagement with the bore of the barrel, and discrete propellant charges for propelling respective projectiles sequentially through the muzzle of the barrel.

The overall shape of the projectile, including the projectile core and the expandable sleeve may be conventionally shaped dart-like, generally spherical or any other convenient shape. The projectile may also include fins that may advantageously be offset to generate a stabilising spin as the dart is propelled from a barrel that may be a smooth-bored barrel.

The projectile charge is located in the propellant space and may be formed as a solid block to assist in loading the barrel assemblies. Alternatively the propellant charge may be encased and may include an embedded primer having external contact means adapted for contacting a pre-positioned electrical contact associated with the barrel. For example the primer could be provided with a sprung contact which may be retracted to enable insertion of the cased charge into the barrel and to spring out into a barrel aperture upon alignment with that aperture for operative contact with its mating barrel contact. If desired the outer case may be consumable or may chemically assist the propellant burn. Furthermore an assembly of stacked and bonded or separate cased charges and projectiles may be provided to facilitate the reloading of a barrel.

The barrel may be non metallic and the bore of the barrel may include recesses that may fully or partly accommodate the ignition means. In this configuration the barrel may house electrical conductors which facilitate electrical communication between the control means and ignition means. This configuration may be utilised for disposable barrel assemblies that have a limited firing life and the ignition means and control wire or wires therefor can be integrally manufactured with the barrel.

A barrel assembly may alternatively include ignition apertures in the barrel and the ignition means are disposed outside the barrel and adjacent the apertures. The barrel may be surrounded by a non metallic outer barrel which may include recesses adapted to accommodate the ignition means. The outer barrel may also house electrical conductors which facilitate electrical communication between the control means and ignition means. The outer barrel may be formed as a laminated plastics barrel which may include a printed circuit laminate for the ignition means.

The electrical ignition for sequentially igniting the propellant charges of a barrel assembly may preferably include the steps of igniting the leading propellant charge by sending an ignition signal through the stacked projectiles, and causing ignition of the leading propellant charge to arm the next propellant charge for actuation by the next ignition signal. Suitably all propellant charges inwardly from the end of a loaded barrel are disarmed by the insertion of respective insulating ruses disposed between normally closed electrical contacts.

Ignition of the propellant may be achieved electrically or ignition may utilise conventional firing pin type methods such as by using a centre-fire primer igniting the outermost projectile and controlled consequent ignition causing sequential ignition of the propellant charge of subsequent rounds. This may be achieved by controlled rearward leakage of combustion gases or controlled burning of fuse columns extending through the projectiles or the barrel.

In another form the ignition is electronically controlled with respective propellant charges being associated with primers which are triggered by distinctive ignition signals. For example the primers in the stacked propellant charges may be sequenced for increasing pulse width ignition requirements whereby electronic controls may selectively send ignition pulses of increasing pulse widths to ignite the propellant charges sequentially in a selected time order. Preferably however the propellant charges are ignited by a set pulse width signal and burning of the leading propellant charge arms the next propellant charge for actuation by the next emitted pulse.

Suitably in such embodiments all propellant charges inwardly from the end of a loaded barrel are disarmed by the insertion of respective insulating fuses disposed between insertion of respective insulating fuses disposed between normally closed electrical contacts, the fuses being set to burn to enable the contacts to close upon transmission of a suitable triggering signal and each insulating fuse being open to a respective leading propellant charge for ignition thereby.

A number of projectiles can be fired simultaneously, or in quick succession, or in response to remote controlled electrical initiation, for example. In such arrangements the electrical signal may be carried externally of the barrel or it may be carried through the superimposed projectiles which may clip on to one another to continue the electrical circuit through the barrel, or abut in electrical contact with one another. The projectiles may carry the control circuit or they may form a circuit with the barrel.

BRIEF DETAILS OF THE DRAWINGS

In order that this invention may be more readily understood and put into practical effect, reference will now be made to the accompanying drawings which illustrate a preferred embodiment of the invention, wherein:

FIG. 1 is a sectional side elevational view of a barrel assembly of an embodiment of the present invention;

FIG. 2 is a perspective view of a plurality of barrel assemblies arranged to form a structural frame for a vehicular weapons platform;

FIG. 4 is a side elevational view showing the arrangement of barrel assemblies in the aircraft of FIG. 3;

FIG. 5 is a front elevational view of the aircraft of FIG. 4;

FIG. 8 is a diagram of the aircraft of FIG. 4 depicting the operational use of lateral barrel assemblies against a target.

DESCRIPTION OF EMBODIMENTS OF THE INVENTION

Figure 3:
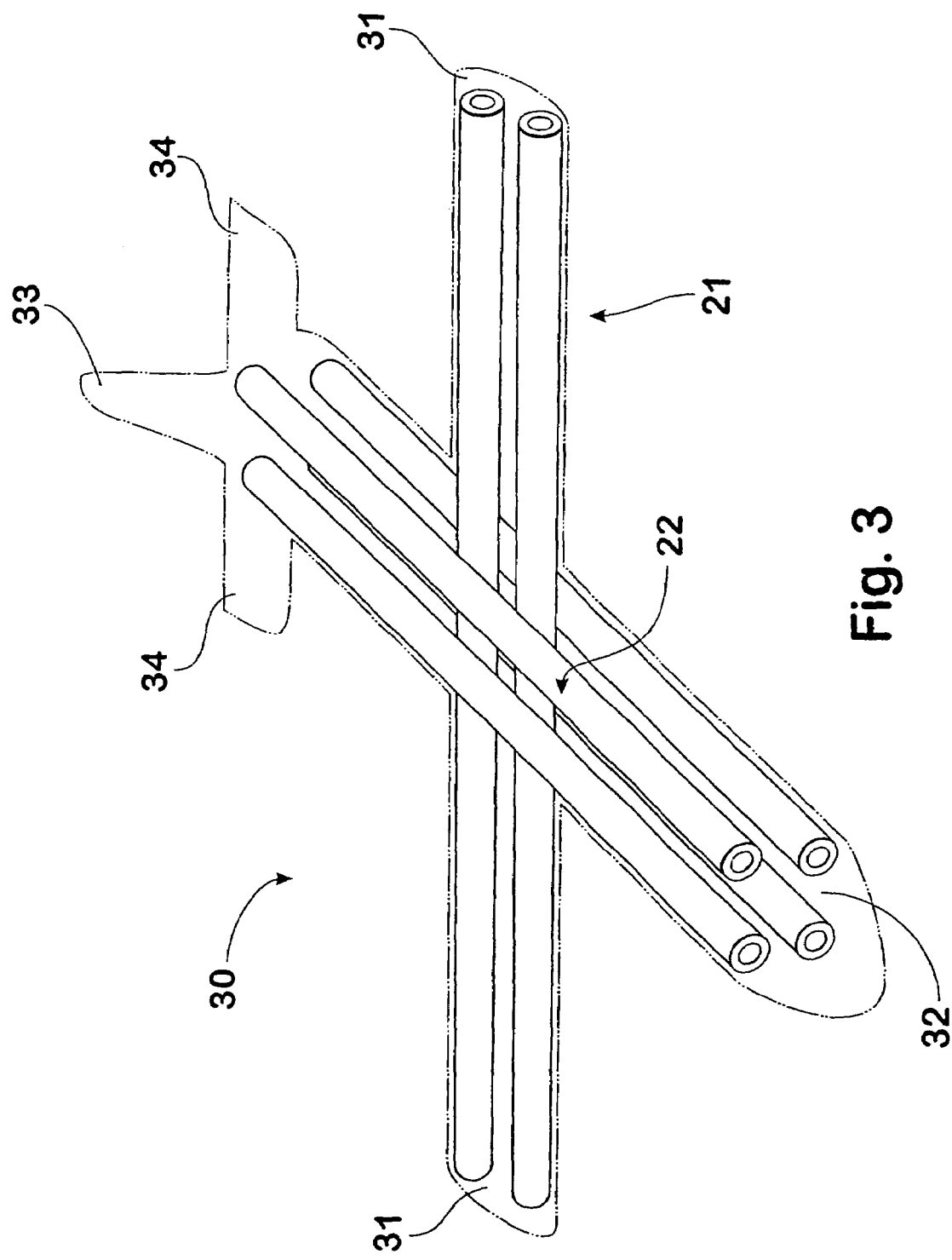
FIG. 3 is a perspective view depicting an aircraft employing the structural frame of FIG. 2.

FIG. 1 shows a barrel assembly 10 including a barrel 11 having opposed muzzle ends 12, 13, wherein the barrel is loaded with a plurality of projectiles 14 and associated propellant charges 15. The barrel of the embodiment is formed from a lightweight carbon fibre based composite material. The barrel 11 has been loaded such that projectiles 14 are axially stacked in the barrel commencing from a common breech wall 16, whereby projectiles may be fired from either or both muzzle ends, as desired. The propellant 15 is arranged to be selectively ignited by electrical means (not shown) so that the projectiles may be sequentially fired at a selected rate of fire from the barrel 11. Desirably the arrangements for firing the projectiles are substantially in accordance with the teachings of earlier patent applications by the present inventor.

A structural frame 20 of a weapons platform is illustrated in FIG. 2, here formed from a plurality of the barrel assemblies 10 described in relation to FIG. 1. The frame 20 includes a group of two laterally extending barrel assemblies 21 and a group of four longitudinally extending barrel assemblies 22. The individual barrels 11 of the groups of barrel assemblies 21, 22 may be permanently or releasably fixed together as required by application. In alternative arrangements, it will be appreciated that a structural frame for a weapons-platform may include barrel assemblies of the kind which have only a single muzzle end. Furthermore, the barrel assemblies may be of different sizes to accommodate different types of ammunition and/or structural requirements.

The structural frame 20 of FIG. 2 is particularly arranged for an aircraft 30 as depicted in FIG. 3. In particular the aircraft 30 is a small combat aerial vehicle (SCAV) of the type that is unmanned and remotely controlled. In the structural arrangement for aircraft 30, the laterally extending barrel group 21 comprise wing spars for the wings 31 of the aircraft and the longitudinally extending barrel group 22 comprise a frame supporting the fuselage 32. The aircraft 30 also includes a tail 33 and a pair of horizontal stabilisers 34, each supported by the fuselage frame. This construction arrangement effectively incorporates a multi-barrelled gun system into the vehicle while adding only marginally to vehicle weight.

Further details of the aircraft 30, proposed in one form to have a length of approximately 9 ft (2.75 m) and a wingspan of approximately 10 ft (3.0 m), are depicted in FIGS. 4 and 5. The barrel assemblies 10 forming the wing spars and fuselage frame carry a total of 780×0.32 (8 mm) rounds, all capable of being separately fired. The total weight of the rounds is estimated to be approximately 12.5 lbs (5.675 kg), with the propellant accounting for 1.1 lbs (0.5 kg) and the barrels adding only 2 lbs (0.9 kg). Some rounds are fired forward 41 and some to the rear (aft) 42 as evident from the side view in FIG. 4, whilst other rounds may be fired laterally from barrels having muzzle ends adjacent the starboard and port wingtips 43, 44 of the aircraft, as seen from FIG. 5.

Figure 6:
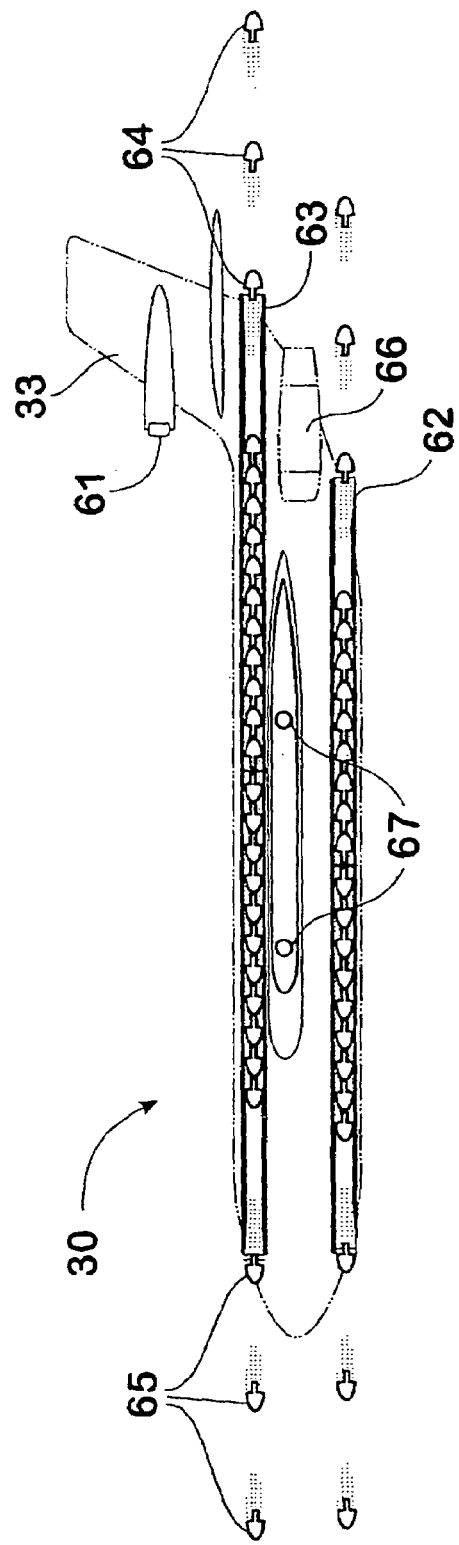
FIG. 6 is a further side view of the aircraft of FIG. 4 depicting the operation use of longitudinal barrel assemblies.

In one mode of operation, the aircraft 30 is capable of firing 270 rounds into a target at a rate of 180,000 rounds per minute (rpm) with zero recoil effect. Recoil is effectively cancelled by firing projectiles 65, 64 from both the forward 41 and aft 42 muzzle ends of the barrel assemblies 10 simultaneously, as depicted in FIG. 6. This mode can deliver 4.3 lbs (1.9 kg) of projectiles onto a target in as little as 0.01 seconds. A surveillance camera 61, mounted on the tail 33 of the aircraft 30 in the present embodiment, may also be used for directing fire onto the target. If required, the rounds 64 fired from the aft muzzle ends 42 may be non-lethal, providing alternative payloads for example decoys or temporary irritants.

In a further mode of operation, the longitudinal barrel assemblies may be fired from their aft muzzle ends 62, 63 only whereby the recoil effect provides a positive boost to air speed.

Figure 7:
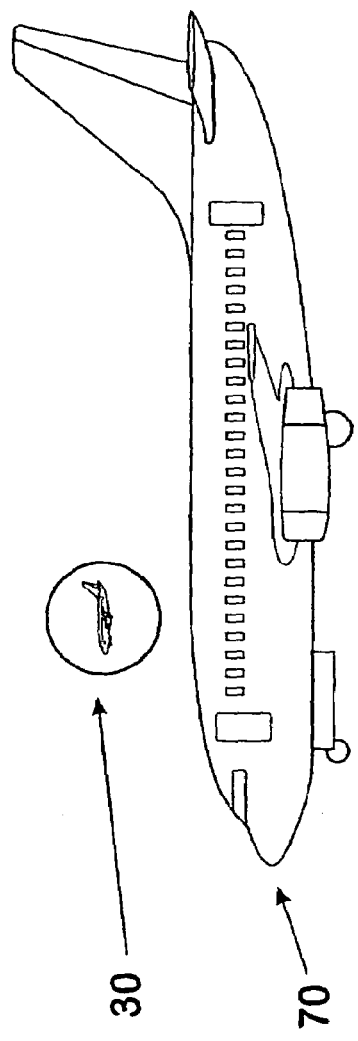
FIG. 7 is another side view of the aircraft of FIG. 4 shown to scale against a larger known aircraft.

The proposed SCAV 30 is shown, in FIG. 7, to scale against a known commercial passenger transport, namely a Boeing 737 airliner 70.

A still further mode of operation is illustrated in FIG. 8 wherein the aircraft 30 loiters over a target 80 in an orbital flight pattern 81. Periodically, and desirably randomly, rounds are fired at the target 80 from the lateral barrel groups having wing tip muzzles 67. This mode can disrupt the morale of enemy forces by causing uncertainty and/or nuisance. Alternatively, a high rate of fire wherein 120 rounds are available at 60,000 rpm, may be used if the circumstances arise. This higher rate can deliver 1.9 lb (0.836 kg) of projectiles onto a target in 0.1 seconds.

The advantages of the above described embodiment of the present invention include addressing the problem of vulnerability of slow moving, low flying aircraft by arming the aircraft with a lightweight weapons system which increases survivability in operation use and also providing a nuisance or morale lowering capability through random, multi-direction fire.

In operation, the SCAV could be launched from a parent aircraft for insertion at any desired altitude, including in one form very high altitude. In high altitude deployment for interception of enemy missile, for example from an airship at 70,000 ft (21,350 m), the aircraft 30 could be powered by a slow burning solid fuel rocket 66 (see FIG. 6). The aircraft would be initially guided by a target acquisition and tracking system on board the airship, for a rapid descent to lower altitudes to then acquire the particular target, such as a cruise missile, with an internal terminal seeker.

It will be appreciated that the aircraft of the embodiment is capable of delivering a disproportionately high kinetic impact relative to its size, together with the ability to fire simultaneously in opposing directions at variable rates of fire (slow or extreme) whilst balancing recoil that might otherwise damage the aircraft and would also disturb the aircraft flight path, attitude or air speed.

It will of course be realised that the above has been given only by way of illustrative example of the invention and that all such modifications and variations thereto as would be apparent to persons skilled in the art are deemed to fall within the broad scope and ambit of the invention as is herein set forth and defined in the claims which follow.

The invention claimed is:

1. An airborne weapons platform comprising:
   a plurality of barrel assemblies, each barrel assembly including a barrel,
      a plurality of projectiles axially disposed within the barrel for operative sealing engagement with a bore of the barrel and propellant charges for propelling respective projectiles sequentially through a muzzle of the barrel, wherein at least one of said plurality of barrel assemblies includes a barrel which also forms a structural member of an airframe of the weapons platform.

2. The weapons platform of claim 1 wherein each barrel is composed of a composite material.

3. The weapons platform of claim 1 wherein the barrel assemblies form wing spars of the airframe.

4. The weapons platform of claim 1 wherein the barrel assemblies form a fuselage of the airframe.

* * * * *